(12) United States Patent
Chokor et al.

(10) Patent No.: US 11,132,893 B2
(45) Date of Patent: Sep. 28, 2021

(54) MULTI-SENSOR EDGE COMPUTING SYSTEM

(71) Applicant: Seagate Technology LLC, Cupertino, CA (US)

(72) Inventors: Abbas Chokor, Longmont, CO (US); Sonia Marrero, Longmont, CO (US); Jonathan P. Jones, Longmont, CO (US); E. Hans Geittmann, Longmont, CO (US); Gregory Christopher Labbe, Longmont, CO (US); Richard E. Rupp, Berthoud, CO (US)

(73) Assignee: Seagate Technology, LLC, Cupertino, CA (US)

( * ) Notice: Subject to any disclaimer, the term of this patent is extended or adjusted under 35 U.S.C. 154(b) by 154 days.

(21) Appl. No.: 16/408,768

(22) Filed: May 10, 2019

(65) Prior Publication Data
US 2019/0347926 A1 Nov. 14, 2019

Related U.S. Application Data

(60) Provisional application No. 62/670,405, filed on May 11, 2018.

(51) Int. Cl.
| G08B 29/18 | (2006.01) |
| H04L 29/08 | (2006.01) |
| H04N 7/18 | (2006.01) |
| G01N 15/14 | (2006.01) |
| G06T 7/246 | (2017.01) |

(52) U.S. Cl.
CPC ........... *G08B 29/188* (2013.01); *G01N 15/14* (2013.01); *G06T 7/246* (2017.01); *H04L 67/12* (2013.01); *H04N 7/183* (2013.01); *G01N 2015/1486* (2013.01); *G06T 2207/30232* (2013.01)

(58) Field of Classification Search
CPC .............. G08B 29/188; G06T 7/246; G06T 2207/30232; G01N 15/14; G01N 2015/1486; H04L 67/12; H04N 7/183
See application file for complete search history.

(56) References Cited

U.S. PATENT DOCUMENTS

| 5,489,782 | A | 2/1996 | Wernikoff |
| 6,411,377 | B1 | 6/2002 | Noguchi et al. |
| 6,678,413 | B1 * | 1/2004 | Liang .................... A61B 5/1113 382/181 |
| 6,857,746 | B2 | 2/2005 | Dyner |
| 7,631,568 | B2 | 12/2009 | Kilps et al. |
| 8,970,475 | B2 * | 3/2015 | Haggerty .............. G06F 3/0418 345/156 |
| 9,116,121 | B2 | 8/2015 | Kaye et al. |
| 9,933,350 | B2 | 4/2018 | Chang et al. |
| 10,054,443 | B1 * | 8/2018 | Patel ...................... H04W 4/029 |
| 10,151,682 | B2 | 12/2018 | Godoy et al. |

(Continued)

*Primary Examiner* — Brian A Zimmerman
*Assistant Examiner* — Kevin Lau
(74) *Attorney, Agent, or Firm* — Hall Estill Law Firm

(57) ABSTRACT

A multi-sensor edge computing system can have at least a sensor assembly connected to an edge computing device and a downstream host. The sensor assembly may have a first sensor and a second sensor with the respective sensors being different. The edge computing device can be configured to identify a false reading of the first sensor in response to data captured by the second sensor.

20 Claims, 5 Drawing Sheets

(56) References Cited

U.S. PATENT DOCUMENTS

| | | | |
|---|---|---|---|
| 2006/0201432 A1* | 9/2006 | Pratt | A01K 29/00 |
| | | | 119/51.02 |
| 2012/0026938 A1* | 2/2012 | Pandey | H04L 43/065 |
| | | | 370/328 |
| 2017/0300971 A1* | 10/2017 | Ohta | G06Q 30/0261 |
| 2018/0275038 A1* | 9/2018 | Cantin | G01N 21/49 |
| 2018/0308202 A1* | 10/2018 | Appu | G06T 1/20 |
| 2018/0310822 A1* | 11/2018 | Indorf | A61B 5/02416 |
| 2019/0339186 A1* | 11/2019 | Remiarz | G01N 15/14 |

* cited by examiner

MULTI-SENSOR EDGE COMPUTING SYSTEM

RELATED APPLICATION

The present application makes a claim of domestic priority under 35 U.S.C. 119(e) to U.S. Provisional Application No. 62/670,405 filed May 11, 2018, the contents of which are hereby incorporated by reference.

SUMMARY OF THE INVENTION

An edge computing system, in accordance with some embodiments, has a sensor assembly connected to an edge computing device and a downstream host. The sensor assembly has a first sensor and a second sensor with the respective sensors being different. The edge computing device is configured to identify a false reading of the first sensor in response to data captured by the second sensor.

DETAILED DESCRIPTION

Various embodiments are generally directed to an edge computing system that utilizes multiple sensors to optimize data collection and utilization, particularly in environments where false alarms are common.

Data collection via one or more sensors can be an efficient manner of detecting conditions in real-time. The use of digital sensors allow data to be collected autonomously and interpreted by the intelligence of a connected computing system. Such autonomy and computing intelligence can monitor a number of environmental and/or operating conditions for threshold events that cause an alarm to be triggered.

While heightened sensitivity of digital sensors can increase precision and resolution of detected conditions, the practical use of such sensors often results in an increase in false alarms. For instance, a thermometer sensor may inadvertently read the temperature of an object instead of the temperature of a housing, which causes a temperature threshold to be exceeded and the triggering of an alarm. Hence, there is a continually goal for sensor systems to have heightened sensitivity, accuracy, and precision with minimal false alarms despite being autonomously monitored and interpreted by a connected computing system.

Accordingly, various embodiments utilize edge computing structure and operation to decrease the occurrence of false alarms in automated multi-sensor systems. Interpreting data close to the sensor allows for efficient data processing that optimizes data network bandwidth and operation while increasing the accuracy of data interpretation. By positioning higher amounts of computing capabilities close to the sensor sources, as opposed to downstream in a data network, data interpretation can become more sophisticated and streamlined without being the victim of other data network activity.

Figure 1:
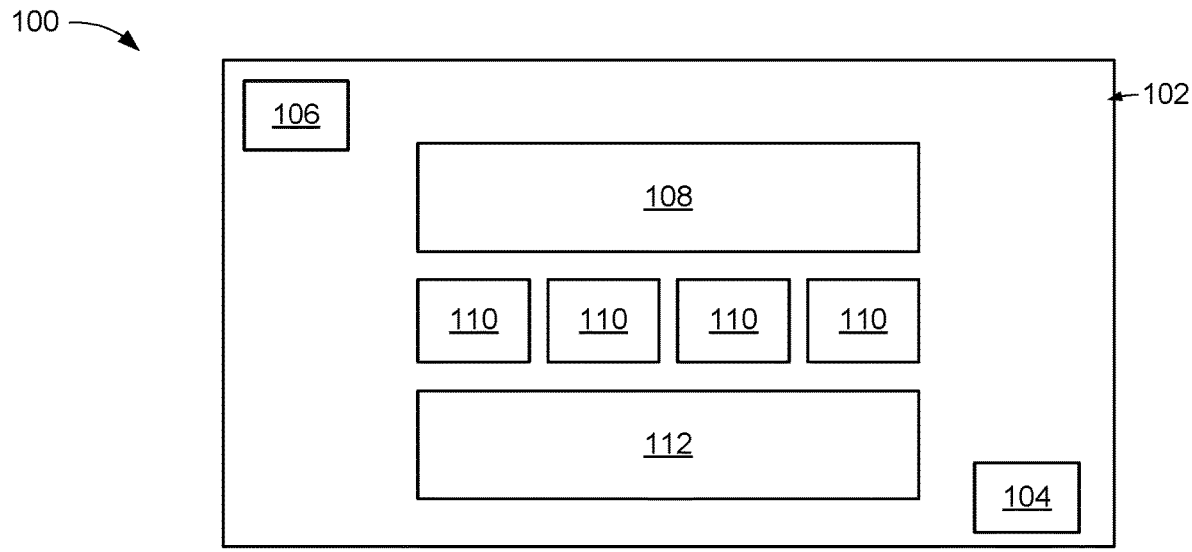
FIG. 1 is a block representation of a portion of an example edge computing system arranged in accordance with various embodiments.

FIG. 1 is a block representation of an example edge computing system 100 in which assorted embodiments may be practiced. The edge computing system 100 can be distributed across multiple different locations, such as cities, states, countries, or continents, or contained within a single location 102. It is contemplated that the single location 102 is an individual building, structure, room, or continuous unconfined space where a first sensor 104 and a second sensor 106 are positioned to monitor conditions.

As a non-limiting example, the first sensor 104 can detect an environmental condition, such as temperature, humidity, air quality, or wind speed, while the second sensor 106 detects dynamic conditions, such as motion, efficiency of equipment 108, number of people 110, or operational throughput of the equipment 108. Hence, the sensors 104/106 can be different types with differing capabilities, such as resolution, accuracy, sensitivity, and refresh rate. Each sensor 104/106 may be a single component or an assembly of multiple different sub-sensors that collectively operate to detect static and/or dynamic conditions of the location 102.

It is contemplated that the sensors 104/106 can detect multiple different conditions concurrently, or individually, while moving, or being static, within the location 102. The sensors 104/106, in some embodiments, store data locally while other embodiments immediately transmit all data generated by the sensors 104/106 to a separate sensor controller 112 without storing any data locally. A single sensor controller 112, such as a server or other computing device, may receive data from both sensors 104/106. Alternatively, each sensor 104/106 may be connected to a separate sensor controller 112 that may, or may not, be connected as part of a distributed sensing network.

Figure 2:
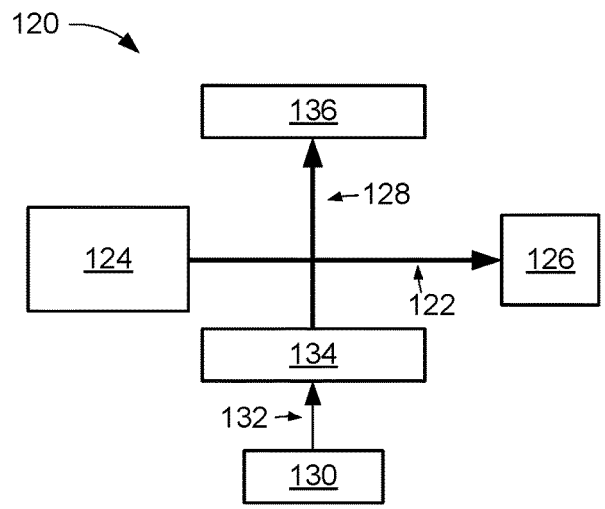
FIG. 2 displays a block representation of portions of an example sensor that may be utilized in the edge computing system of FIG. 1.

FIG. 2 displays a block representation of an example particle counting sensor 120 that may be employed in the edge computing system 100 of FIG. 1. The particle counting sensor 120 may have one or more optical beams 122 produced by at least one optical emitters 124. A first optical beam 122 passes to a first optical detector 126 where a calibration voltage can be obtained. It is contemplated that the first optical detector 126 may comprise an assembly of optical elements, such as a limited beam stop and angled reflector.

Figure 3:
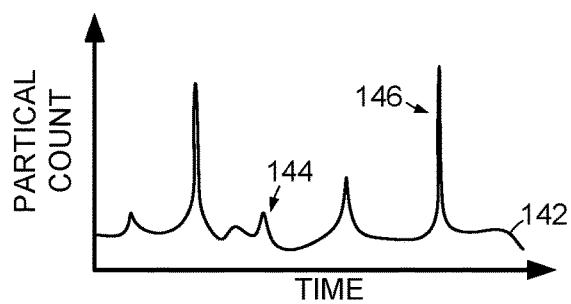
FIG. 3 plots data associated with portions of an example edge computing system operated in accordance with some embodiments.

A second optical beam 128 passes to a second optical emitter 130 through one or more collection lenses 132 from a reflector 134. The second optical beam 128 may be generated via scattering from particles being hit by the first optical beam 122 to produce an output signal at the second optical detector 136. FIG. 3 plots an example output signal 142 from the particle counting sensor 120 over time.

As shown by the output signal 142, particle count values can fluctuate and may have natural spikes 144 where air quality in a location 102 is reduced temporarily. However, the optical operation of the particle counting sensor 120 can produce artificial spikes 146 when optical events, such as motion and object reflection, alter one, or both, optical beams 122/128. That is, motion of equipment 108 and/or people 110 can degrade signal 142 accuracy and cause artificial spike(s) 146 that do not correspond with the number of particles in the air. The signal 142 may also have degraded accuracy due to light reflecting off of stationary equipment 108 and/or people 110.

The presence of artificial spikes 146 can be difficult to identify, and nearly impossible to correct, in real-time due to the latency of signal transmission to the sensor controller and subsequent controller processing. In addition, a single sensor signal 142 is often inadequate to accurately identify an artificial particle count spike 146, even after processing by a downstream controller. Accordingly, various embodiments utilize multiple sensors connected to local computing components to efficiently identify and accommodate artificial spikes 146, which optimizes the accuracy of sensor operation.

Figure 4:
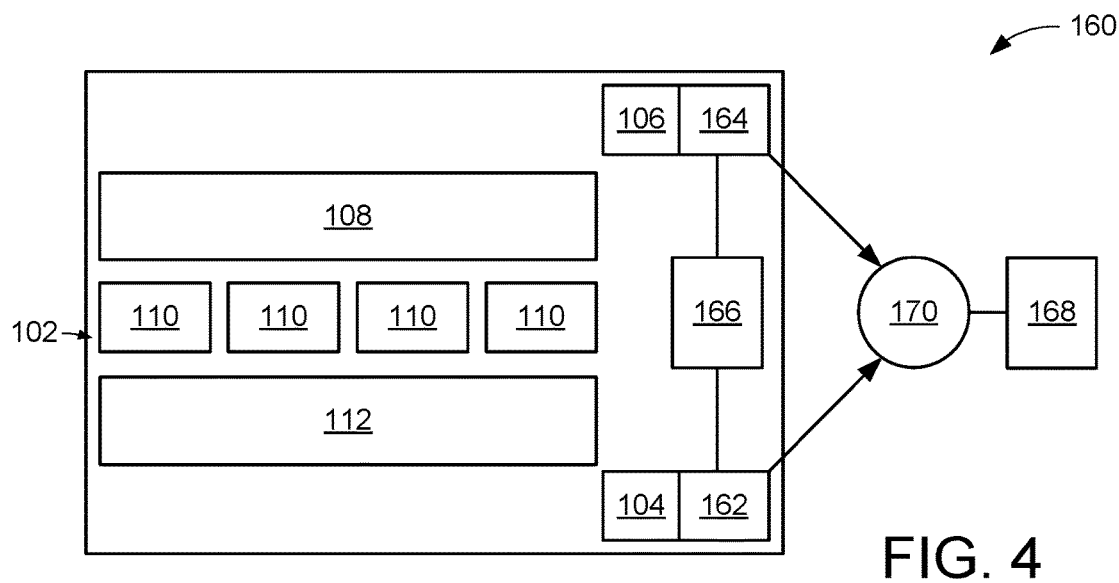
FIG. 4 illustrates a block representation of an example edge computing system arranged and operated in accordance with various embodiments.

FIG. 4 represents an example edge computing system 160 configured and operated in accordance with various embodiments to mitigate false readings from one or more sensors 104/106. Although not required or limiting, each sensor 104/106 may comprise an assembly of two different types of detection equipment, such as a video recorder, camera, proximity detector, particle count detector, and hygrometer, that can concurrently detect different conditions of the location 102 in real-time.

The multiple detection means of each sensor can be packaged with a local computing device that can efficiently process condition signals to identify suspect signal deviations. For instance, the first sensor 104 can be locally connected, such as within a common housing or physically packaged together, to a first computing device 162 while a second sensor 106 is locally connected to a second computing device 164. It is contemplated that a single, local computing device 162/164 is packaged with, and electrically connected to, multiple different sensor assemblies, but such arrangement is not required.

The computing devices 162/164 packaged together with the sensor assemblies 104/106 may operate independently, but may also be connected to one or more downstream hosts 166/168 as part of a distributed computing network. A first downstream host 166 may be physically positioned within the location 102 and a second downstream host 168 may be physically positioned elsewhere and connected via a wired and/or wireless network 170. As shown, the computing devices 162/164 may be concurrently connected to multiple hosts, but some embodiments configure the system 160 with connection to a single host 166/168.

With the packaging of the computing devices 162/164 physically and electrically proximal the detection equipment signal source of the respective sensor assemblies 104/106, the computing devices 162/164 can be characterized as on the edge of the distributed data network that comprises at least one downstream host 166/168. The edge computing configuration of FIG. 4 allows detected data to be preliminarily analyzed by the computing devices 162/164 prior to being transmitted and processed by one or more downstream hosts 166/168. Such preliminary analysis provides the ability to efficiently correlate data from multiple different detection means of the sensors 104/106 to identify potential false readings.

Figure 5:
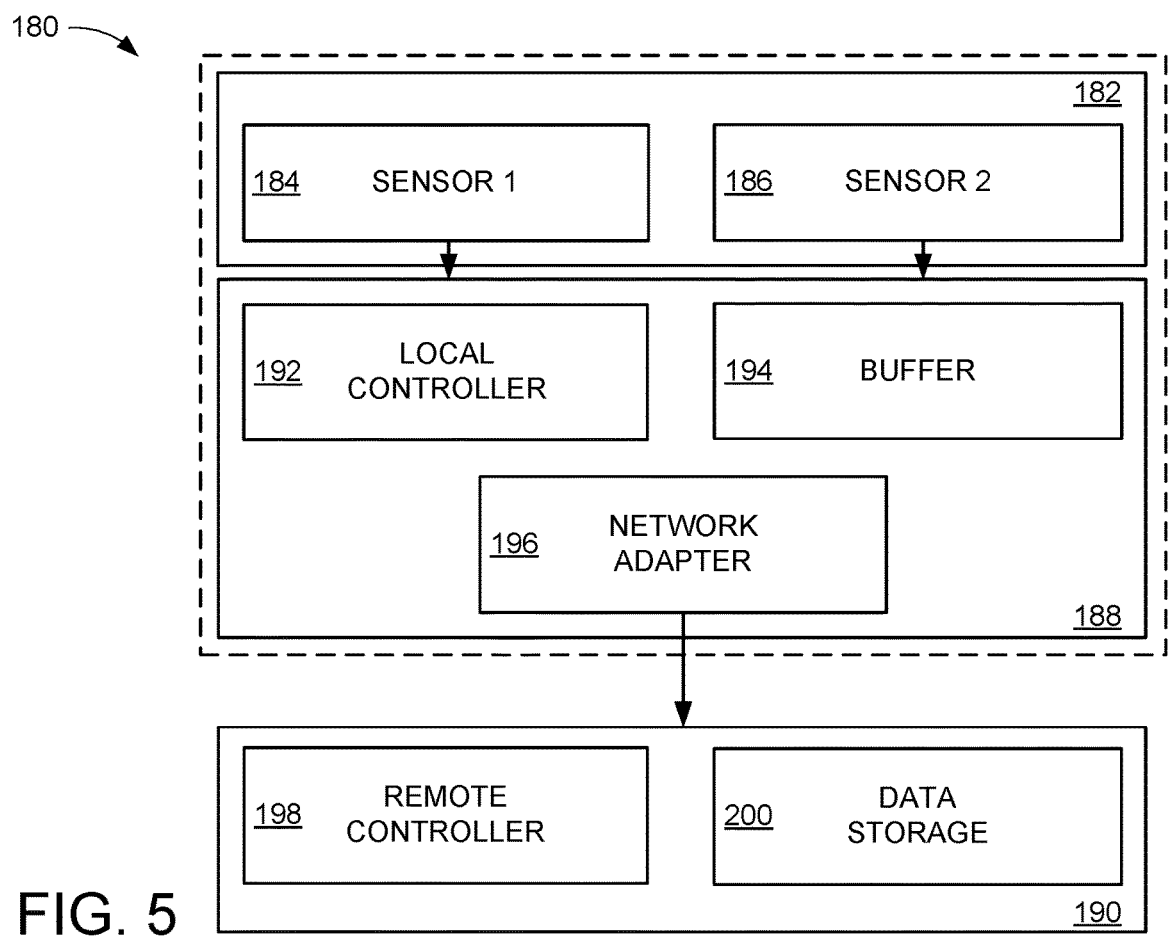
FIG. 5 represents portions of an example edge computing system configured in accordance with assorted embodiments.

FIG. 5 displays an example computing package 180 that can be employed by an edge computing system in accordance with various embodiments. The computing package 180 has a sensor assembly 182 that may comprise any number, and type of static and/or dynamic condition detection equipment. For example, a first sensor 184 can be particle counting equipment and a second sensor 186 can be a camera capable of recording still pictures and/or video. The sensor assembly 182 can be physically connected, be housed within a common housing, as shown by segmented lines, or be within one foot of an edge computing device 188 that is configured to preliminarily analyze signals and data from the sensor assembly 182 prior to a downstream host 190.

While not required or limiting, the edge computing device 188 can have a local controller 192, such as a microprocessor or other intelligent circuitry, that can identify potentially false readings in the signals from the respective sensors 184/186. The local controller 192 can selectively store data in one or more local buffers 194, which may be temporary or permanent data storage means, such as a rotating magnetic media, non-volatile solid-state memory array, or volatile memory array. The computing device 192 may also have a network adapter 196 that allows for wired and/or wireless communication of data to/from at least one downstream host 190.

A downstream host 190 can have a remote controller 198 as well as data storage 200 that may be different than the edge computing device 188. As a non-limiting example, the edge computing device 188 may comprise relatively small data storage capacity and low processing capabilities compared to the capabilities of the downstream host 190, but the processing of only data and signals generated by the sensor assembly 182 allows for efficient data processing and transmission latency to the downstream host 190 where more robust processing can be undertaken.

The ability to conduct preliminary sensor assembly 182 data analysis with the edge computing device 188 reduces the computing load on the downstream host 190 and allows the host 190 to efficiently and concurrently, service multiple different sensor assemblies 182 that may be located in a single location, or multiple different locations. By assigning sensor data processing duties to the edge computing device 182, the downstream host 190 can conduct more sophisticated analysis on portions of data identified to be potentially false instead of scouring the entirety of a sensor data stream.

Figure 6:
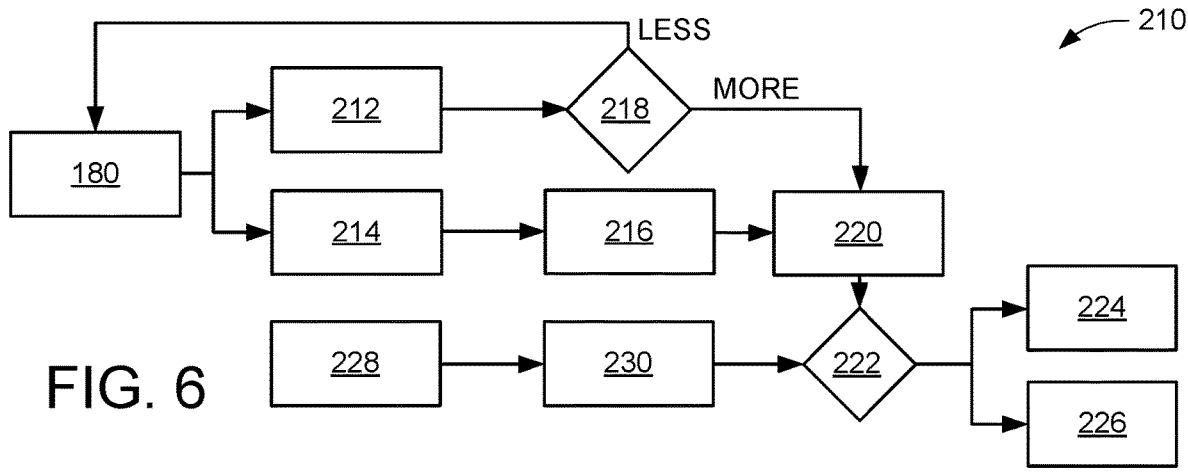
FIG. 6 depicts an example logic chart that can be conducted by an edge computing system in accordance with some embodiments FIG. 7 conveys an example motion detection routine that may be carried out with the assorted embodiments of FIGS. 1-5.

FIG. 6 conveys a logic chart for an example sensor data operation 210 that can be conducted by the embodiments of the edge computing system 160 of FIGS. 4 & 5. It is noted that while various aspects of operation 210 are directed to the sensing of particles and video collection, the operation 210 may be utilized with other types of detected information, such as static environment conditions and dynamic operating conditions.

The operation 210 initially collects data pertaining to at least two different conditions within a location from an edge computing package 180. A particle count sensor optically detects a number of particles in a volume of air within a location in step 212 while video surveillance is conducted with at least one camera within the location in step 214. The video surveillance data is temporarily stored in a data storage means of a computing device of the edge computing package in step 216 while a controller of the edge computing package compares the particle count data to a predetermined threshold value in decision 218.

If the detected particle count is less than the predetermined threshold, decision 218 prompts for the deletion of the stored video surveillance data and returns to the collection of data in steps 212 and 214. That way, video that does not correspond with a spike in particle count is not sent to a downstream host and does not occupy the bandwidth of the distributed network. In the event the particle count exceeds the predetermined threshold in decision 218, the video and particle count data is sent downstream in step 220 to one or more hosts for processing. It is contemplated that step 220 involves saving and processing the detected data locally without sending any data downstream.

Regardless of where post-threshold exceedance data processing is conducted, decision 222 evaluates the video and particle count data to determine if the spike in particle count is natural or is artificial. Decision 222 can utilize any number and variety of algorithms, models, and calculations from any number of local, and remote, sources to determine if the elevated particle count is artificial and corresponds with a false reading in step 224 or is natural and corresponds with a real reading in step 226. In other words, decision 222 can be conducted anywhere and may obtain decision-making intelligence locally or from remote hosts in a manner that optimizes the accuracy and speed of decision 222.

In some embodiments, a local, or remote, controller loads historical data in step 228 and current detected data into a deep learning model in step 230 to conduct decision 222. Such historical data may be logged data from within a common location or may be data obtained from numerous different sensing systems. The deep learning model can be customized to a particular computing package position within a location, which may take into account the historical data 228, the position of equipment, number of people proximal the computing package, and environmental deviations over time to provide an intelligent determination if a detected particle spike is natural or artificial.

Figure 7:
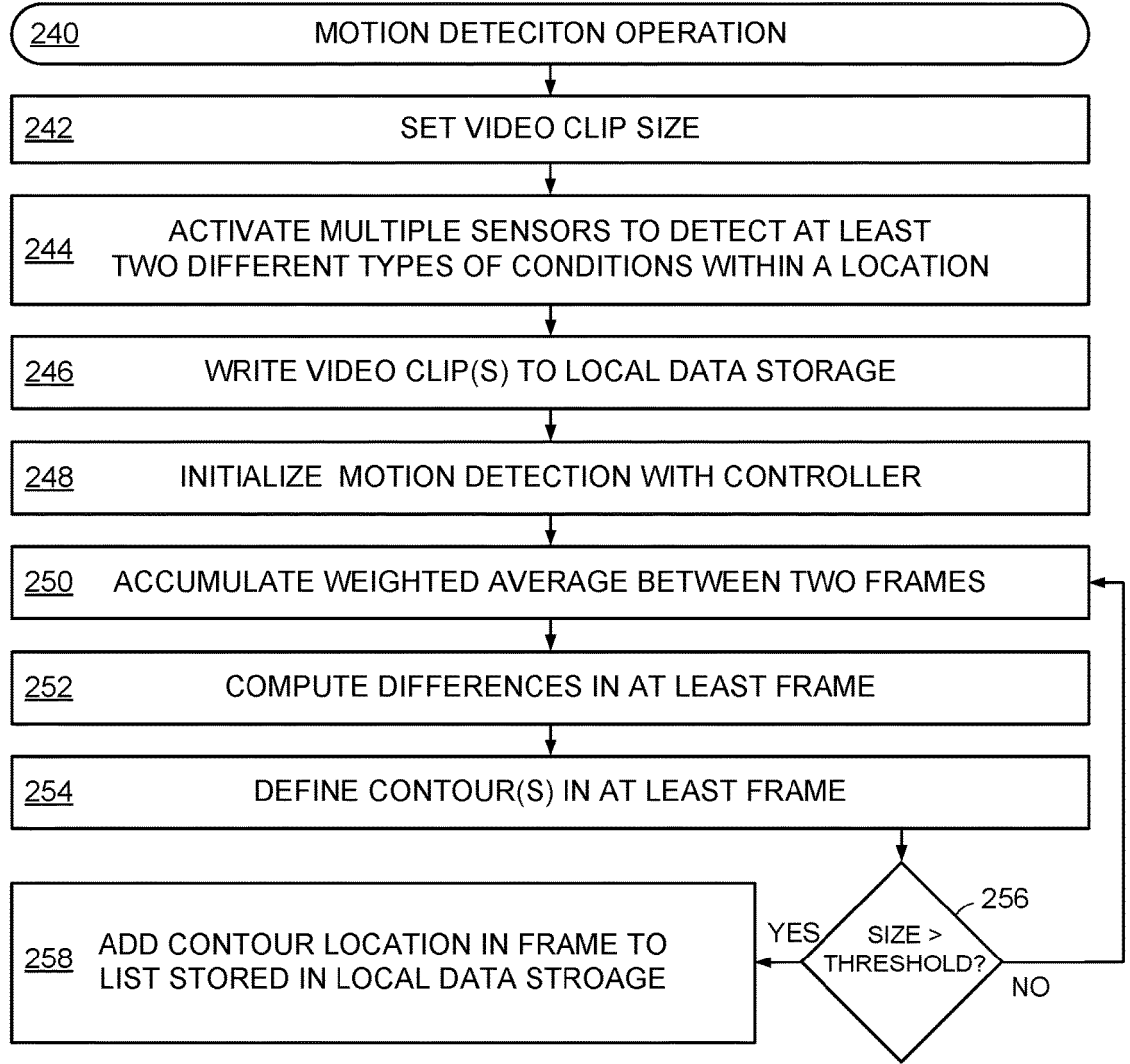

FIG. 7 depicts an example motion detection operation 240 that may be carried out by an edge computing system in accordance with some embodiments. It is contemplated, but not required, that an edge computing device carries out the motion detection operation 240 as part of a sensor data operation prior to sending any detected data downstream to a host. An edge computing device can begin the operation 240 by setting a video clip size in step 242 by initializing the data storage buffer as a queue with a selected number of video frames to be temporarily stored while data analysis is conducted. Step 242 may also set a time threshold for video to be temporarily saved before being deleted, which acts as a timeout for the data analysis for the edge computing device.

Step 244 proceeds to activate multiple sensors, and at least one camera, concurrently to detect at least two different types of conditions within the location where the sensor are positioned. The edge computing device packaged with the multiple sensors writes one or more video clips of the clip size selected in step 242 to temporary data storage in step 246. The saved video clip(s) are then initialized in step 248 by the edge computing device controller for motion detection, which may involve altering the size, resolution, color, contrast, or brightness of one or more images of the saved video clip(s).

Next, step 250 accumulates the weighted average between two frames of a saved video clip. Such weighted average can evaluate the size, number of pixels, and/or number of different colors between two frames, which allows step 252 to compute the pixel-wise differences between a selected frame of the saved video clip and a running average. It is noted that the weighted average may bias comparison of frames to one or more parameters while the running average can be a simple average of a selected parameter over a given number of frames.

The pixel-wise differences are utilized in step 254 to define the contours of at least one frame by enhancing a region where differences are experienced. For instance, step 254 can remove portions of a frame that do not change frame-to-frame while smoothing lines, colors, and transitions via image processing. It is contemplated that the edge computing device controller uses image processing techniques to artificially enhance portions of a frame in step 254 by adding, removing, or changing characteristics of the frame to more clearly define contours.

Decision 256 evaluates if the size of the contours defined in step 254 exceeds a predetermined threshold area. Decision 256 may loop the defined contours from several consecutive, or non-consecutive, frames to determine the size of the contours, which corresponds with the size of a frame where motion may be present. A contour area size that is above the predetermined threshold triggers step 258 to add the contour location on the frame to a list stored in local memory, which saves the location in a frame where motion is present. A contour area size that is below the predetermined threshold causes decision 256 to return routine 240 to step 250 where differences in frames are accumulated.

Figure 8:
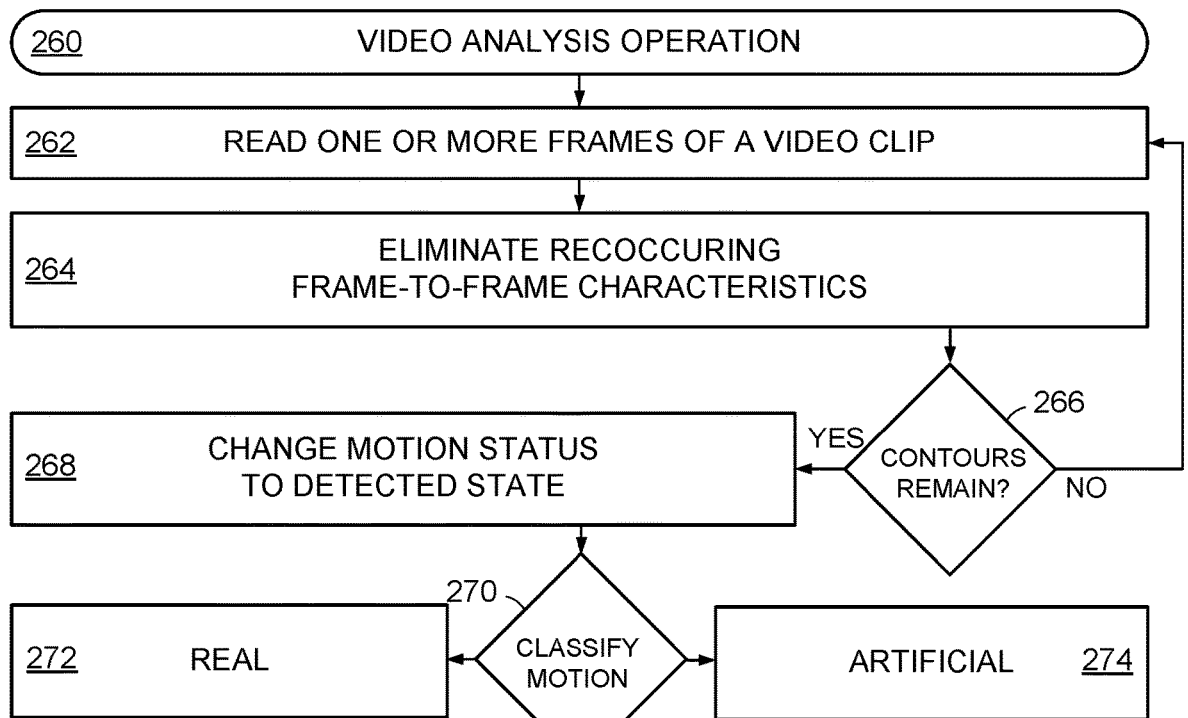
FIG. 8 is an example video analysis operation that can be conducted by an edge computing system in accordance with various embodiments.

The stored list of motion locations within one or more frames allows the edge computing device controller to efficiently analyze the contour(s) of different frames to determine if the motion is natural or artificial without processing every pixel of multiple frames of a video clip. FIG. 8 is an example video analysis operation 260 that can be conducted with an edge computing system in accordance with various embodiments. The operation 260 reads one or more frames of a saved video clip as directed by an edge computing device controller in step 262.

One or more characteristics of the frame(s) of the saved video clip, such as contours, colors, color boundaries, and shapes, can be masked in step 264 by the edge computing device controller. Such masking of step 264 can eliminate reoccurring characteristics frame-to-frame to indicate motion. Decision 266 evaluates if contours remain. If so, step 268 is triggered to change the motion status of the video clip to a "detected" state. In the event no contours are present, the video clip status is set, or remains in a default, "undetected" state.

The detected video clip state prompts decision 270 to compare the motion remaining after masking to a contour mapping algorithm that classifies the motion as real and natural in step 272 or artificial and false in step 274. The contour mapping algorithm may be used independently, or in combination with other image processing algorithms, to characterize motion with respect to the timing of a spike in sensor signal, such as a particle count, and determine if the spike in sensor signal is likely contributable to the detected motion (artificial) or to the actual condition within a location (natural).

Figure 9:
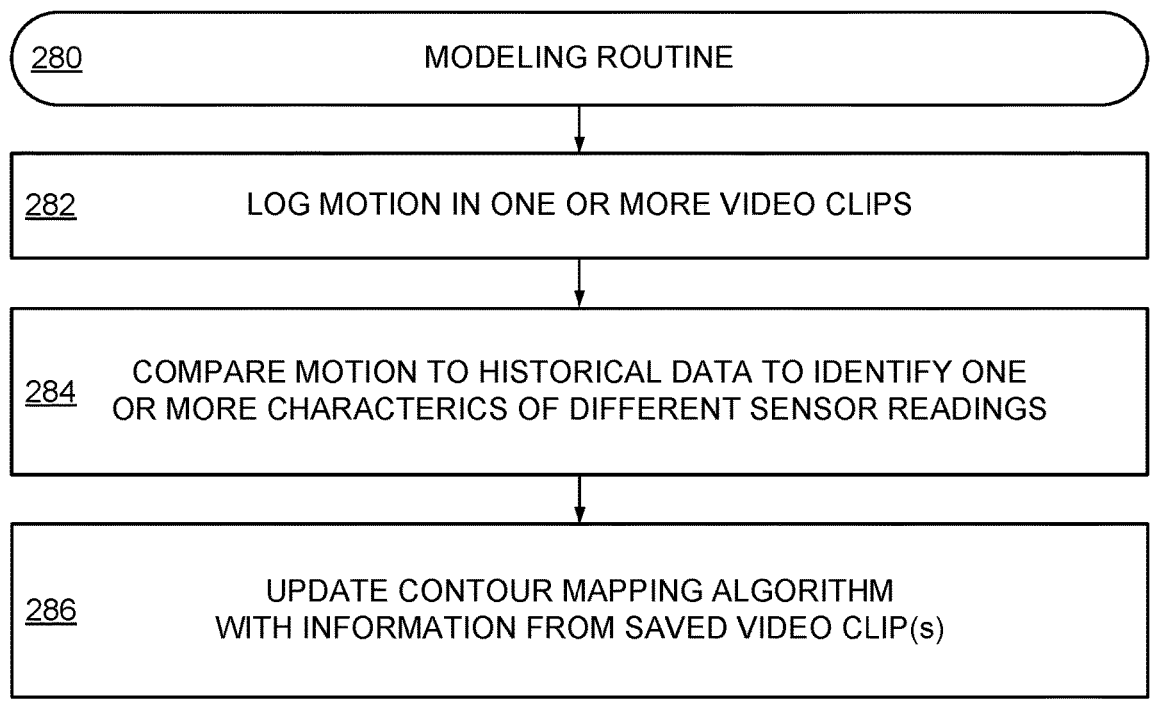
FIG. 9 provides an example modeling routine employed by an edge computing system in accordance with some embodiments

FIG. 9 provides an example modeling routine 280 that can be carried out by various aspects of an edge computing system to produce an optimized motion classification capability customized for a particular sensor assembly in a particular positon within a particular location. Initially, an edge computing device controller logs motion identified in one or more video clips in step 282. The edge computing device controller then compares the motion logged in step 282 with historical data in step 284 to identify one or more characteristics of real and/or false detected sensor readings, such as particle count.

It is noted that step 282 may access one or more databases, which may be stored locally or remotely with respect to an edge computing device, to recover historical motion data. For instance, an edge computing device controller can access, or retrieve, historical motion data for the same sensor and/or sensor position within a location from a downstream host to carry out step 284. Alternatively, the edge computing device controller may access historical data stored in the edge computing device without accessing any downstream host.

While not exhaustive, limiting, or required, it is contemplated that the frame location, color, duration, size, shape, and range of deviation of logged motion can be compared to real, or false, historical data in step 284. Such comparison allows step 286 to subsequently update a contour mapping algorithm with the information of the saved video clip to improve the accuracy of the historical data and the identification of real, and false, motion from analysis of a video clip. The modeling routine 280 allows for the adaptation of video analysis by an edge computing device controller to increase the accuracy of motion classification and accommodate changing operational conditions in a location.

For instance, the modeling routine 280 can adapt to different uniforms being worn by people in a location that have different reflectivity and motion characteristics than previous uniforms. Hence, motion analysis can progressively improve to provide optimized motion classification as it pertains to condition sensing, like particle counts. The modeling of historical motion analysis and results can further allow an edge computing device controller, and/or a downstream host, to predict when motion will occur and/or when motion will interfere with other sensor readings, such as particle count or proximity detection.

Figure 10:
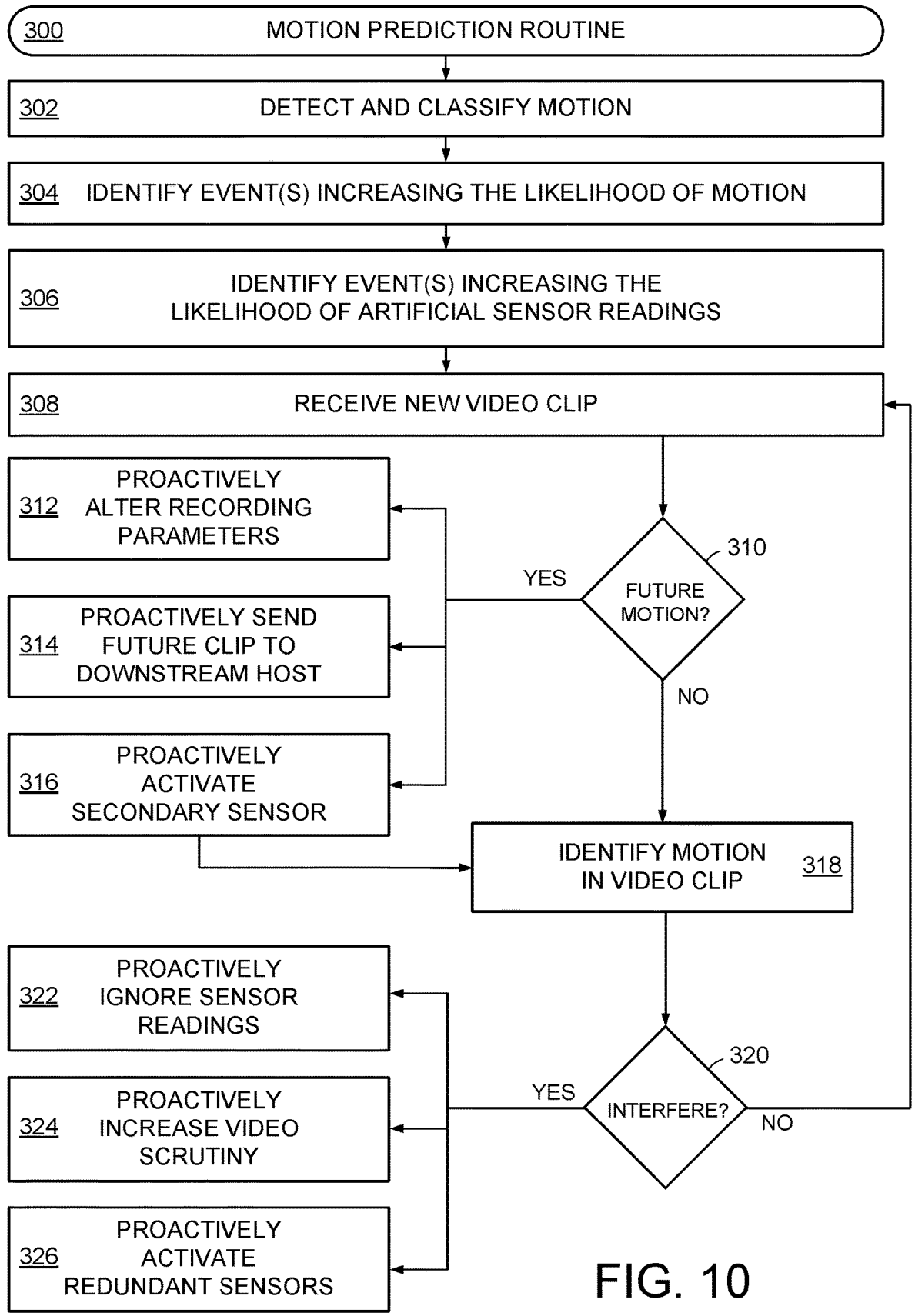
FIG. 10 shows an example prediction routine that can be utilized by the edge computing system of FIGS. 1-5 in accordance with various embodiments.

FIG. 10 conveys an example motion prediction routine 300 that can be carried out by an edge computing system in accordance with assorted embodiments. At any time, motion can be detected and classified by an edge computing system in step 302, which allows an edge computing device controller, and/or downstream host, to identify event(s) increasing the likelihood of motion in step 304 and motion characteristics that increase the likelihood of artificial readings by one or more sensors in step 306.

It is contemplated that routine 300 generates and updates a motion prediction algorithm that calculates a percentage accuracy of predicted motion and/or a motion interference algorithm that calculates the percentage accuracy of motion interfering with other sensor readings. Such algorithms may be stored locally in an edge computing device to allow routine 300 to efficiently process video clips temporarily stored in a data storage means of the edge computing device.

Once motion, and motion interference, can accurately be predicted, such as having an accuracy above a predetermined threshold, like 70%, 80%, or 90%, step 308 receives a video clip. Decision 310 then evaluates at least one frame of the video for events that can lead to future motion. A determination that motion is likely with an accuracy above a predetermined threshold triggers at least one of several different proactive activities for an edge computing system. For example, and in no way limiting, an edge computing system can proactively alter video recording parameters in step 312, such as increasing video resolution, color contrast, or frame rate, proactively send future video clips to downstream hosts for processing in step 314, or proactively activate a secondary sensor, or sensor assembly, within a location in step 316.

At the conclusion of any proactive measures, or if no motion is predicted with high enough accuracy, step 318 identifies that motion indeed occurs in the video clip received in step 308. It is noted that the motion of step 308 may be pixel-wise resolution or post-masked contours, like those from step 264. Decision 320 proceeds to evaluate the motion to determine if motion will likely interfere with readings of another sensor(s). If so, a variety of proactive activities can be conducted.

As non-limiting examples, step 322 can proactively ignore sensor readings in anticipation of artificial deviations in detection, step 324 can proactively increase the scrutiny of video analysis and/or other sensor readings, step 326 can proactively conduct redundant sensor readings from the same, or another, sensor, and step 328 can proactively give greater weight to sensor readings from other sensors in the system.

As a result of the proactive activities conducted in response to predicted motion in decision 310 or predicted reading interference in decision 320, sensor readings can be more efficiently analyzed by an edge computing device controller without occupying undue volumes of downstream host bandwidth. Activating proactive activities can further decrease the latency of motion classification with respect to interference with other sensor readings. Accordingly, the identification of false sensor readings can be more accurately, and quickly, provided, which allows the edge computing system to accommodate and/or correct the false readings without degrading other system performance.

Through the various embodiments of an edge computing system, abnormal motion can automatically be detected using video surveillance in combination with edge computing analytics. Continuously buffering real-time videos, along with deep learning data-driven modeling, analyzes saved video clips at the edge of a distributed computing network and automatically distinguishes between false and real readings from other sensors, such as particle counts. The resulting increase in sensor reading reliability allows a system to provide early warning when conditions exceed defined limits, make better process improvement decisions, improve operating conditions and maintenance cycles in a location, and correlate various events to yield loss.

What is claimed is:

1. A system comprising a sensor assembly connected to an edge computing device in a single building and to a downstream host positioned external to the single building, the sensor assembly comprising a first sensor and a second sensor, the edge computing device comprising a local controller configured to identify a false reading of the first sensor in response to the local controller determining motion detected in the single building by the second sensor is artificial, not real, and will interfere with operation of the first sensor.

2. The system of claim 1, wherein the edge computing device is physically connected to the sensor assembly within a single room of the single building.

3. The system of claim 1, wherein the first sensor is a particle counting sensor and the second sensor is a camera.

4. The system of claim 1, wherein each sensor is positioned within a housing with the local controller and network adapter.

5. The system of claim 4, wherein each sensor is connected to a remote controller of the downstream host via the respective network adapters.

6. A method comprising:
   connecting a first sensor to a first edge computing device in a single building;
   connecting a second sensor to a second edge computing device in the single building, each edge computing device connected to a downstream host;
   detecting motion with the first edge computing device from data collected by the first sensor;
   classifying the detected motion as artificial, not real, and likely to interfere with the second sensor by a local controller of the first edge computing device; and
   identifying a false reading of the second sensor in response to the detected artificial motion, the second sensor functioning normally.

7. The method of claim 6, wherein the first sensor detects different conditions in the single building than the second sensor.

8. The method of claim 6, wherein the first edge computing device initializes motion detection to accumulate a weighted average between at least two frames of data collected by the first sensor.

9. The method of claim 8, wherein the first edge computing device computes differences in at least one frame of data collected by the first sensor.

10. The method of claim 6, wherein the first edge computing device defines contours in the at least two frames of data.

11. The method of claim 10, wherein the first edge computing device eliminates at least one frame-to-frame characteristic from the at least two frames of data.

12. The method of claim 6, wherein the first edge computing device employs a contour mapping algorithm to classify the detected motion.

13. A method comprising:
   connecting a first sensor to a first edge computing device in a single building;
   connecting a second sensor to a second edge computing device in the single building, each edge computing device connected to a downstream host;
   detecting motion with the first edge computing device from data collected by the first sensor;
   classifying the detected motion as artificial and not real;
   predicting a false reading of the second sensor in response to the detected artificial motion; and
   ignoring readings from the second sensor until the detection motion stops.

14. The method of claim 13, wherein the motion is classified by the first edge computing device.

15. The method of claim 13, wherein the detected motion is correlated to an increased likelihood of motion by the first edge computing device.

16. The method of claim 15, wherein the downstream host identifies the increased likelihood of motion increases a likelihood of artificial readings.

17. The method of claim 13, wherein the prediction of a false reading results from a prediction of motion interference above a predetermined accuracy threshold.

18. The method of claim 13, wherein the first edge computing device proactively alters a recording parameter in response to the predicted false reading.

19. The method of claim 13, wherein the first edge computing device proactively activates a secondary sensor in response to the predicted false reading.

20. The method of claim 19, wherein the secondary sensor is a redundant sensor to the first sensor.

\* \* \* \* \*